(12) United States Patent
Harayama

(10) Patent No.: US 7,847,876 B2
(45) Date of Patent: Dec. 7, 2010

(54) DISPLAY DEVICE HAVING IMPACT RESISTANT FRAME WITH RECESSES ALONG CORNER PARTS

(75) Inventor: Takeshi Harayama, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 477 days.

(21) Appl. No.: 11/878,106

(22) Filed: Jul. 20, 2007

(65) Prior Publication Data
US 2008/0030642 A1 Feb. 7, 2008

(30) Foreign Application Priority Data
Aug. 7, 2006 (JP) ............................. 2006-214291

(51) Int. Cl.
*G02F 1/1333* (2006.01)
(52) U.S. Cl. ...................................................... 349/58
(58) Field of Classification Search .................. 349/58; 361/679.21
See application file for complete search history.

(56) References Cited
U.S. PATENT DOCUMENTS
5,680,183 A * 10/1997 Sasuga et al. ................. 349/58
5,737,053 A * 4/1998 Yomogihara et al. ........ 349/149
6,411,501 B1 * 6/2002 Cho et al. ............... 361/679.27
6,801,289 B2 * 10/2004 Ichioka et al. ............... 349/152
2001/0026334 A1 * 10/2001 Natsuyama ................... 349/58
2002/0163614 A1 * 11/2002 Hinata et al. ................. 349/139

FOREIGN PATENT DOCUMENTS
JP 11-231294 2/1998
JP 2003-43469 7/2001

* cited by examiner

*Primary Examiner*—Michael H Caley
(74) *Attorney, Agent, or Firm*—Stites & Harbison, PLLC; Juan Carlos A. Marquez, Esq.

(57) ABSTRACT

A liquid crystal display device includes a molded resin frame, and a liquid crystal display panel formed by putting first and second substrates together and set in the molded resin frame. Two thick corner parts of the liquid crystal display panel where the first and the second substrate overlap each other, and two thin corner parts of the liquid crystal display panel including only the first substrate are separated from the molded resin frame by forming recesses in parts of the molded resin frame corresponding to the thick and the thin corner parts of the liquid crystal display panel. Each of the recesses respectively corresponding to the thin corner parts of the liquid crystal display panel has an end part corresponding to a part of the liquid crystal display panel where a corner part of the second substrate and a part of a side of the first substrate overlap each other.

1 Claim, 3 Drawing Sheets

DISPLAY DEVICE HAVING IMPACT RESISTANT FRAME WITH RECESSES ALONG CORNER PARTS

CLAIM OF PRIORITY

The present application claims priority from Japanese Application JP 2006-214291 filed on Aug. 7, 2006, the content of which is hereby incorporated by reference into this application.

BACKGROUND OF THE INVENTION

1. Field of the Invention

The present invention relates to a display device and, more particularly, to a liquid crystal display device provided with a liquid crystal display panel having an improved impact resistance and set in a resin frame formed by molding.

2. Description of the Related Art

A liquid crystal display device is a representative example of a display device. A liquid crystal display device includes a liquid crystal display panel and a driving circuit in combination, and is provided with a back light in case of need. The liquid crystal display panel is built by putting first and second substrates together with a liquid crystal layer held between the respective inside surfaces, namely, the major surfaces, of the first and the second substrate. Formed on the major surface of the first substrate are a plurality of scanning lines, and a plurality of data lines perpendicular to the scanning lines and isolated from the scanning lines by an insulating layer. Pixels are formed at the intersections of the scanning lines and the data lines, respectively. The pixels are arranged in a matrix to form a pixel area, namely, an effective display area. The scanning and the data lines are formed of a metal, preferably, aluminum. A plurality of color filters are formed on the inside surface of the second substrate. Normally, the color filters are red, green and blue filters. The first and the second substrate are put together, and peripheral gaps are sealed with a sealant.

FIG. 3 is a top view of a liquid crystal display panel PNL for a liquid crystal device, and FIG. 4 is a side view taken in the direction of the arrow A in FIG. 3. The PNL is formed by putting together two substrates SUB1 and SUB2 with their inside surfaces facing each other, and sealing a liquid crystal in a space between the substrates SUB1 and SUB2. These substrates SUB1 and SUB2 are thin glass plates. A plurality of scanning lines and a plurality of data lines perpendicular to the scanning lines and isolated from the scanning lines by an insulating layer are formed on the inside surface of the first substrate SUB1.

Generally, the two substrates SUB1 and SUB2 are put together in the following manner. The length of the right and the left side of the second substrate SUB2 is shorter than that of the right and the left side of the first substrate SUB1. The second substrate SUB2 is put on the first substrate SUB1 such that the upper, the right and the left side of the second substrate SUB2 are aligned with those of the first substrate SUB1, respectively, and the lower side of the second substrate SUB2 is on the inner side, the upper side as viewed in FIG. 3, of the lower side of the first substrate SUB1. Thus a lower part of the inside surface of the first substrate SUB1 is exposed. A scanning line driver chip DRV and a data line driving chip DRV provided with driving circuits are mounted on the exposed part of the first substrate SUB1. In FIG. 3, the scanning line driver chip DRV is on the left-hand side and the data line driver chip DRV is on the right-hand side.

Terminals of a flexible printed wiring board (flexible printed circuits) FPC are bonded to the exposed area of the liquid crystal display panel PNL on which the driver chips DRV are mounted, and then the four sides of the liquid crystal display panel PNL are fitted in grooves formed in a molded resin frame MLD. The flexible printed wiring board FPC is extended outside through an opening formed in the molded resin frame MLD. Recesses RET are formed in the four inner corners of the molded resin frame MLD to separate corner parts of the liquid crystal display panel PNL in which stress concentration is liable to occur to prevent the corner parts of the liquid crystal display panel PNL from cracking. A conventional liquid crystal display panel is provided in its four inner corners with the same recesses RET.

In an active matrix type liquid crystal display panel, thin-film transistors are formed in the vicinities of the intersections of the scanning lines and the data lines formed on a first substrate SUB1. Such a first substrate SUB1 is called also a thin-film transistor substrate. Color filters are formed on a second substrate SUB2 and hence the second substrate SUB2 is called a color filter substrate. Since the first substrate SUB1 and the second substrate SUB2 are thin glass plates, the first substrate SUB1 and the second substrate SUB2 crack and fissure easily when an external impact is applied thereto.

Methods of preventing cracking are disclosed in JP-A-2003-43469 (Patent document 1) and JP-A-11-231294 (Patent document 2). A method disclosed in Patent document 1 cuts off corner parts of a polarizing plate to prevent the formation of bubbles in the polarizing plate and to prevent the breakage of light-emitting diodes even if the glass substrates are chipped hot and humid conditions. A method disclosed in Patent document 2 puts a printed wiring board into close contact with the back surface of a liquid crystal display panel such that corners of the printed wiring board protrude outside from the edges of the liquid crystal display panel to prevent the direct application of shocks to the substrates of the liquid crystal display panel.

SUMMARY OF THE INVENTION

In the molded resin frame MLD provided with the recesses RET1 to RET4 as shown in FIG. 3, the recesses RET1 and RET2, which are provided on the both corner potions on the E1 side of the first substrate SUB1, are contiguous only with the first substrate SUB1. Cracks CRK are liable to develop from parts of the first substrate SUB1 in contact with parts P1 and P2 of the short sides of the molded resin frame MLD at the ends of the recesses RET1 and RET2 on the side of the recesses RET4 and RET3 because the parts P1 and P2 are in contact only with the first substrate SUB1. Such cracks were formed when the liquid crystal display device was subjected to a drop test. When suck cracks are formed in the liquid crystal display device after the liquid crystal display device has been incorporated into an apparatus, the reliability of the apparatus will be significantly impaired.

Accordingly, it is an object of the present invention to provide a liquid crystal display device of high reliability including a molded resin frame, and a liquid crystal display panel having substrates and set in the molded resin frame, and capable of preventing the cracking of the substrates when an external impact is applied to the liquid crystal display panel.

The present invention provides a liquid crystal display device provided with a liquid crystal display panel including a molded resin frame, a panel assembly formed by putting first and second substrates together and set in the molded resin frame; wherein parts of parallel short side members of the molded resin frame near corners where the parallel short side members are joined to a long side member of the molded resin frame are in contact with parts of the parallel short sides of both the first and the second substrate.

The substrates of the liquid crystal display panel set in the molded resin frame will not crack when an external impact is applied to the liquid crystal display panel and hence the high reliability of the liquid crystal display device will not be impaired.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Embodiments of the present invention will now be described hereinafter with reference to the accompanying drawings.

First Embodiment

Figure 1:
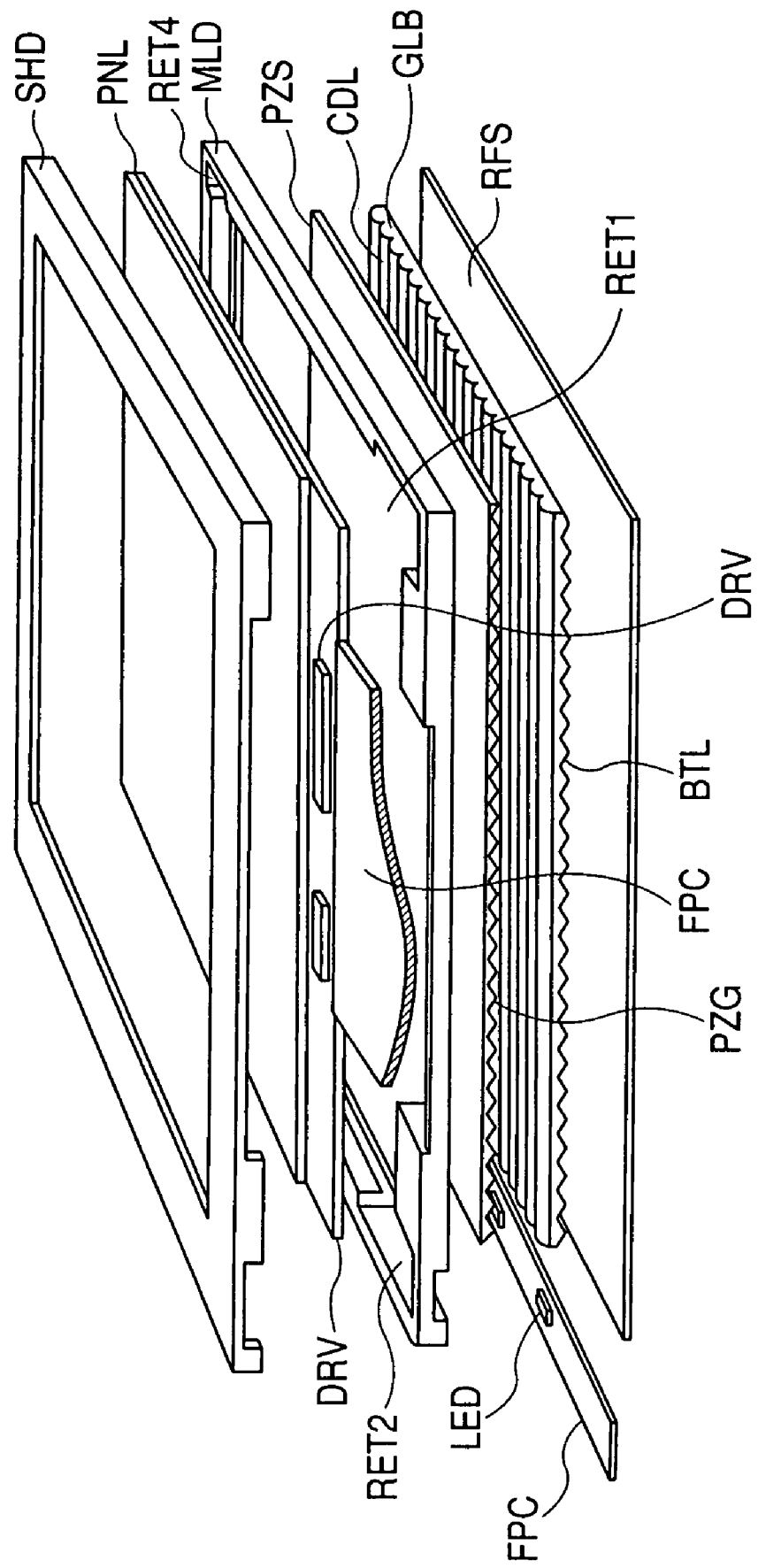
FIG. 1 is an exploded perspective view of a liquid crystal display device in a first embodiment according to the present invention.

Referring to FIG. 1 showing a liquid crystal display device in a first embodiment according to the present invention, the liquid crystal display device has a liquid crystal display panel PNL formed by putting together a rectangular first substrate SUB1 and a rectangular second substrate SUB2 smaller than the first substrate SUB1. A liquid crystal layer is sealed in a space formed between the first substrate SUB1 and the second substrate SUB2. The short sides of the second substrate SUB2 are shorter than those of the first substrate SUB1.

A plurality of scanning lines and a plurality of data lines are formed on a major surface, namely, the inside surface, of the first substrate SUB1.

A plurality of color filters are formed on a major surface, namely, the inside surface, of the second substrate SUB2.

The liquid crystal display panel PNL including the first substrate SUB1 and the second substrate SUB2 is set in a molded resin frame MLD. Three sides of the second substrate SUB2 coincide respectively with three sides of the first substrate SUB1. One of the three sides of the first substrate SUB1 has a length equal to that of the corresponding one of the second substrate SUB2. A receded one of sides of the second substrate SUB2 other than those three sides is on the inner side of a corresponding side of the first substrate SUB1. Therefore, a part of the major surface of the first substrate SUB1 is exposed. Driver chips DRV provided with driving circuits are mounted on the exposed part of the major surface of the first substrate SUB1.

Figure 2:
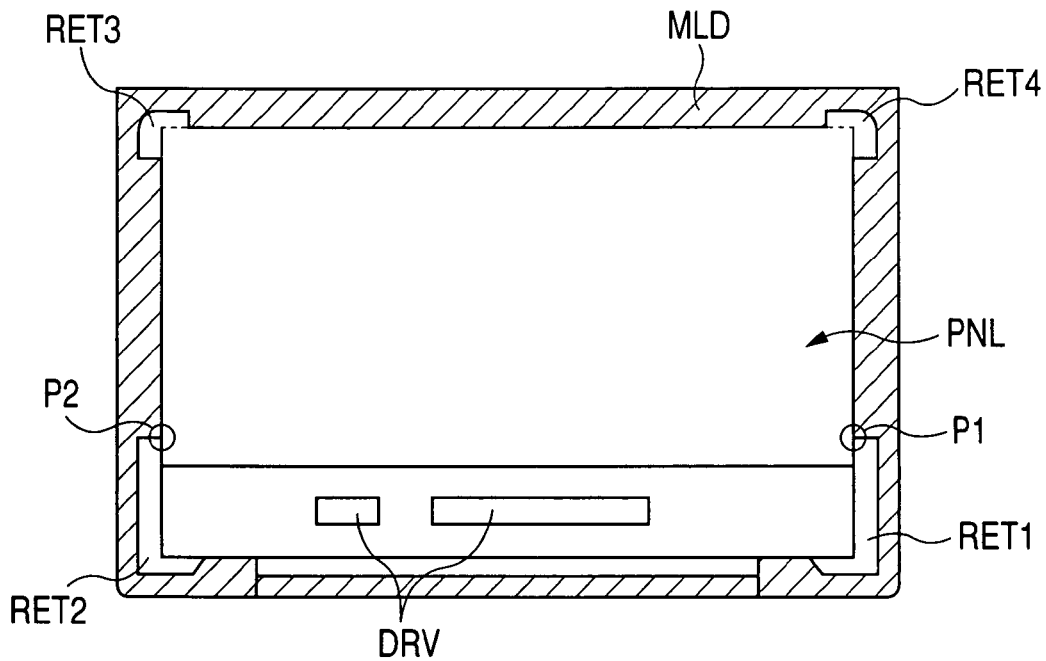
FIG. 2 is a plan view of an assembly of a liquid crystal display panel and a molded resin frame included in the liquid crystal display device shown in FIG. 1.
Figure 3:
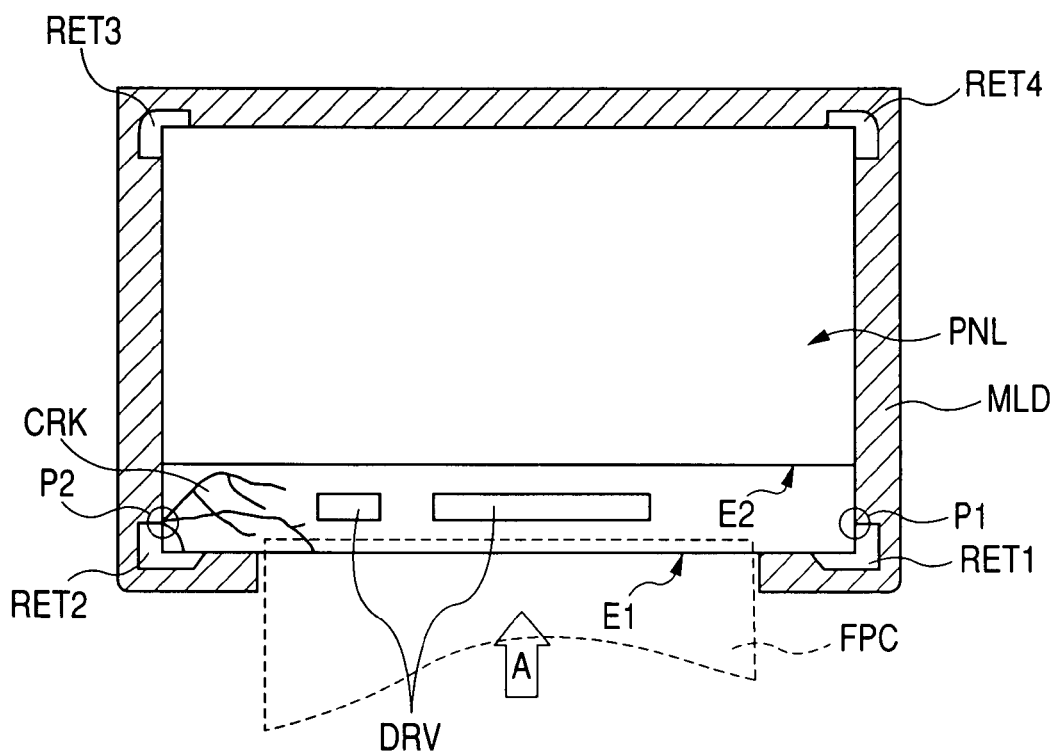
FIG. 3 is a top view of a liquid crystal display panel included in a liquid crystal display device.
Figure 4:
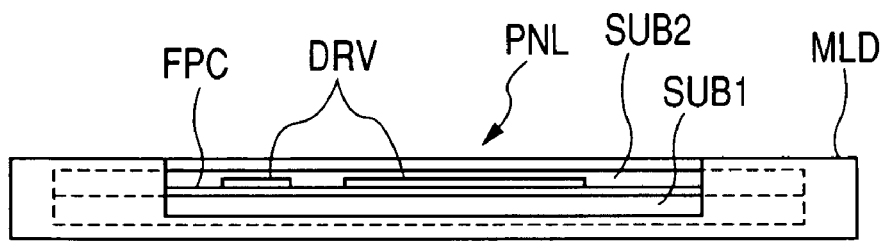
FIG. 4 is a side elevation taken in the direction of the arrow A in FIG. 3.

Corner parts of the inside surface of the molded resin frame MLD corresponding to lower corner parts, as viewed in FIG. 2, of the exposed part of the first substrate SUB1 and lower corner parts, as viewed in FIG. 2, of the second substrate SUB2 are cut to form recesses RET1 and RET2, respectively, to separate those corner parts from the molded resin frame MLD. Desirably, corner parts of the inside surface of the molded resin frame MLD corresponding to upper corner parts, as viewed in FIG. 2, of the first substrate SUB1 and the second substrate SUB2 are cut to form recesses RET3 and RET 4 to separate those corner parts from the molded resin frame MLD.

The molded resin frame MLD is formed in a size larger than that of the liquid crystal display panel PNL. The liquid crystal display panel PNL is set in the molded resin frame MLD. The molded resin frame MLD is provided in corner parts of its inside surface with the recesses RET1 to RET4. In some cases, corner parts of the liquid crystal display panel PNL cracks when vibrated if the corner parts are contiguous with the molded resin frame MLD because stress concentration is liable to occur in the corner parts of the liquid crystal display panel PNL. Therefore, the molded resin frame MLD needs to be provided with the recesses RET1 to RET4 to prevent the cracking of the corner parts of the liquid crystal display panel PNL. Strictly speaking, the recesses RET1 to RET4 of the molded resin frame MLD are opposite to the side walls of the liquid crystal display panel PNL.

If the recesses RET1 to RET4 are excessively large, the molded resin frame MLD is in contact with the liquid crystal display panel PNL in an excessively small contact area, and parts of the liquid crystal display panel PNL in contact with the molded resin frame MLD are liable to crack due to stress concentration on those parts. Therefore, parts of the sides of the liquid crystal display panel PNL need to be in contact with the molded resin frame MLD so that the sides of the liquid crystal display panel PNL may not crack.

The recesses RET3 and RET4 are opposite to thick corner parts of the liquid crystal display panel PNL where the first substrate SUB1 and the second substrate SUB2 overlap each other, namely, first corner parts.

The recesses RET1 and RET2 on the side of the exposed part of the first substrate SUB1 on which the driver chips DRV are mounted are opposite to the side walls of the liquid crystal display panel PNL. Although the driver chips DRV are mounted on the first substrate SUB1 in this embodiment, the driver chips DRV may be mounted on a flexible wiring board and the flexible wiring board may be attached to the first substrate SUB1.

The recesses RET1 and RET2 are opposite to second corner parts of the liquid crystal display panel PNL, namely, corner parts of only the first substrate SUB1. The second corner parts are thinner than the first corner parts. Each of the second corner parts has a first side having a thin part including only the first substrate SUB1 and a thick part including both the first substrate SUB1 and the second substrate SUB2, and a second side having only a thin part, i.e., only the first substrate SUB1. Thus each of the recesses RET1 and RET2 is opposite to the first side having the thin part and the thick part, and the second side having only the thin part.

An end part, namely, an upper end part, as viewed in FIG. 2, of a part, extending along the side, namely, the vertical side as viewed in FIG. 2, having the thick part and the thin part, of each of the recesses RET1 and RET2 corresponds to the thick part. Thus stress concentration on only the first substrate SUB1 can be obviated to suppress the cracking of the first substrate SUB1. The thin part of the side having both the thin and the thin part is easily cracked. In the liquid crystal display panel of the present invention, the thin parts of the sides each having both the thick and the thin part are separated from the molded resin frame MLD. Thus the thin parts are prevented from being cracked.

A recess is formed in a part of the long side member, extending along the long side of only the first substrate SUB1, of the molded resin frame MLD. A flexible printed wiring board mounted on the exposed part of the first substrate SUB1 is extended outside through the recess formed in the long side member of the molded resin frame MLD. The side of the exposed part of the first substrate SUB1 excluding the opposite corner parts is in contact with the molded resin frame MLD.

A flexible printed wiring board FPC is bonded to an edge part of the exposed part of the major surface of the first substrate SUB1. The flexible printed wiring board FPC is connected to an external display signal source, not shown, provided with a microcomputer.

Optical compensation sheets including a diffusing sheet are attached to the back surface of the liquid crystal display panel PNL. Typically, the diffusing sheet is a prism sheet PRZ. The optical compensation sheets disperse illuminating light for illuminating the liquid crystal display panel PNL in a uniform distribution on the liquid crystal display panel PNL. A light guide plate GLB is attached to the back surface of a laminated structure including the optical compensation sheets. The light guide plate GLB has a front surface, namely, an upper surface, as viewed in FIG. 1, serving as a deflecting surface CDL provided with prisms. Light-emitting diodes LED mounted on the flexible printed wiring board FPC are disposed near one end edge of the light guide plate GLB. A reflecting sheet FRS is attached to the back surface of the light guide plate GLB. A structure including those components is fixedly held between a shield frame on the front side, namely, the viewer's side, and a back case, not shown, disposed behind the reflecting sheet FRS to form the liquid crystal display device.

FIG. 2 is a plan view of an assembly of the liquid crystal display panel PNL and the molded resin frame MLD shown in FIG. 1. As mentioned in connection with FIG. 1, the liquid crystal display panel PNL is set in the molded resin frame MLD. The molded resin frame MLD is provided in corner parts of its inside surface with the recesses RET1 to RET4. Each of the recesses RET1 and RET2 on the side of the exposed part of the first substrate SUB1 on which the driver chips DRV are mounted has the end part of the part, extending along the vertical side having the thick part and the thin part, of each of the recesses RET1 and RET2 corresponds to the thick part in which the first substrate SUB1 and the second substrate SUB2 overlap each other. The recesses RET3 and RET4 are opposite to thick corners, where the first substrate SUB1 and the second substrate SUB2 overlap each other, of the liquid crystal display panel PNL. Thus the recesses RET3 and RET4, similarly to the recesses RET1 and RET2, have a cracking preventing effect.

The substrates of the liquid crystal display panel PNL are prevented from cracking when an external impact is applied to the liquid crystal display panel PNL set in the molded resin frame MLD. Thus the liquid crystal display device provided with the liquid crystal display panel PNL has high reliability.

Second Embodiment

Figure 5:
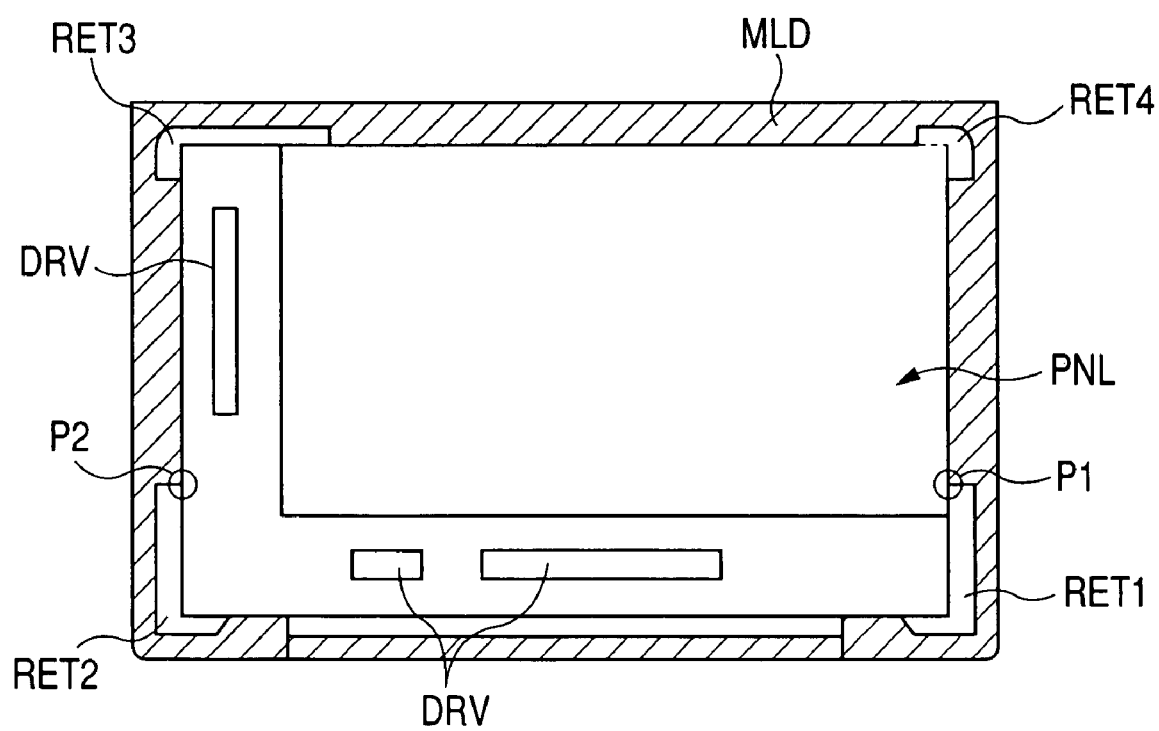
FIG. 5 is a plan view of assistance in explaining a liquid crystal display device in a second embodiment according to the present invention.

Referring to FIG. 5 showing a liquid crystal display device in a second embodiment according to the present invention, the liquid crystal display panel of the second embodiment is formed by putting together a first substrate and a second substrate by a method different from that by which the first substrate SUB1 and the second substrate SUB2 of the liquid crystal display panel PNL in the first embodiment are put together. As shown in FIG. 5, one long side and one short of the second substrate are aligned with one long side and one short side of the first substrate. A part of a major surface of the first substrate extending along the long and the short side of the second substrate receded inside from the corresponding long and the short side of the first substrate is exposed, and driver chips are mounted on the exposed part of the major surface of the first substrate. A molded resin frame is provided with recesses RET1 to RET4. The recesses RET1 and RET2 are symmetrical. The recess RET4 is opposite to a thick corner part where the first and the second substrate overlap each other. The recesses RET1 and RET3 have end parts which are opposite to thick parts where the first and the second substrate overlap each other, respectively. The first and the second substrate of the liquid crystal display device in the second embodiment, similarly to those of the liquid crystal display device in the first embodiment, are prevented from cracking when an external impact is applied to the liquid crystal display panel. Thus the liquid crystal display device has high reliability.

Although the present invention has been described as applied to the liquid crystal display device, the present invention is applicable also to displays employing easily breakable glass or ceramic substrates. The present invention exercises the foregoing effects when applied to a display provided with a display panel formed by putting two substrates together and having parts differing from each other in thickness.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A liquid crystal display device, comprising:
    a molded resin frame; and
    a liquid display panel formed by putting a color filter substrate and a TFT substrate larger than the color filter substrate together in a first direction and set in the molded resin frame;
    wherein the molded resin frame has an inner wall and the liquid crystal display panel is enclosed by the inner wall of the molded resin frame,
    wherein the liquid crystal display panel has, near a side extending in the first direction, a thick part where the color filter substrate and the TFT substrate overlap each other, and a thin part that includes only the TFT substrate,
    wherein the inner wall of the molded resin frame has recesses so that the inner wall of the molded resin frame does not contact with the thin part of the liquid crystal display panel and does not contact with a boundary between the thick part and the thin part of the liquid crystal display panel at the side extending in the first direction, and
    wherein the inner wall of the molded resin frame is in contact with a side of the thin part that extends in a second direction perpendicular to the first direction.

* * * * *